G. ELSEY.
Stove-Pipe Stretchers, &c.

No. 144,967. Patented Nov. 25, 1873.

Witnesses.
Jos. B. Loomis.
G. E. Upham,

Inventor.
Geo. Elsey.
Chipman Hosmer & Co
attys,

UNITED STATES PATENT OFFICE.

GEORGE ELSEY, OF STERLING, ILLINOIS.

IMPROVEMENT IN STOVE-PIPE STRETCHERS, &c.

Specification forming part of Letters Patent No. 144,967, dated November 25, 1873; application filed May 24, 1873.

*To all whom it may concern:*

Be it known that I, GEORGE ELSEY, of Sterling, in the county of Whitesides and State of Illinois, have invented a new and valuable Improvement in Stove-Pipe Stretchers and Boot-Jacks; and I do hereby declare that the following is a full, clear, and exact description of the construction and operation of the same, reference being had to the annexed drawings, making a part of this specification, and to the letters and figures of reference marked thereon.

Figure 1:
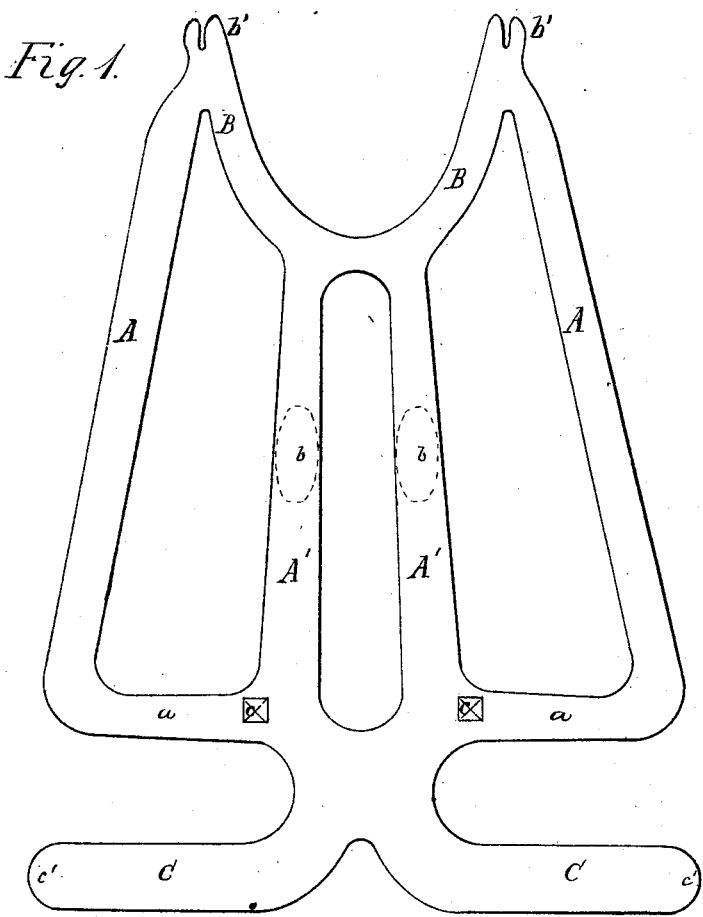
Figure 2:
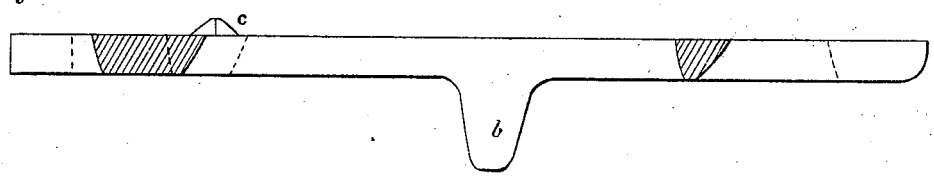
Figure 3:
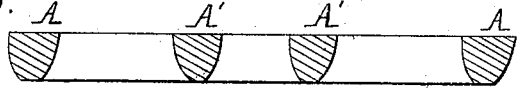

Figure 1 of the drawings is a representation of my stove-pipe stretcher and boot-jack by a top view. Fig. 2 is a longitudinal central section of the same.

My invention relates to a stove-pipe stretcher, &c.; and it consists of a skeleton wedge, which is inserted into the end of a stove-pipe, and turned around with the application of pressure, whereby the end of the stove-pipe is enlarged or stretched. The object of my invention is to have a tool of simple construction, which may be easily operated, and may be bought for a trifling expense, to do the work of stretching stove-pipes, for the purpose of fitting them together after they have been separated for the purpose of cleaning.

In the drawings, A represents an inclined bar, which is united with another inclined bar, A, by a parabolical or horseshoe bar, B, at one end, and a straight shoulder, $a$, at the other end, to which, also, two handles, C, are attached. The outer sides of the inclined bars A are the working parts in the operation of stretching the stove-pipe. The frame A B $a$ is strengthened by two parallel central braces, A′, which are provided with two legs, $b$, and with two studs, $c$, on the opposite side.

With the aid of the said legs $b$, my stove-pipe stretcher may serve as a boot-jack, the curved bar B being at sufficient elevation from the ground to insert and jam the lower part of the boot into it. The studs $c$ serve to support the broad end of a flat-iron, when it is desirable to have a flat-iron stand. The ends $b'$ of the curved bar B may be provided with tapered slots, so as to serve as nail and tack pullers. The spaces between the bars A′ A′, or A A′ and $a$ C, are so graduated as to suit a very great variety of nuts as wrenches.

To use the described implement as stove-pipe stretcher, the stove-pipe is placed on the ground in an upright position, and may be held between the operator's feet, as in a clamp. The implement is then inserted into the stove-pipe with the small end down and the handles C up. The operator, by taking hold of the handles C, presses the implement gently down into the pipe, and revolves it, thereby stretching or flaring the pipe, so that the matching pipe may be inserted without trouble or expense, as is the case when the assistance of the tinner is required for the performance of this simple and frequent domestic operation.

What I claim as new, and desire to secure by Letters Patent, is—

A skeleton stove-pipe stretcher having the inclined bars A, curved bar B, shoulder-bars $a$, and handles C, with or without the brace-bars A′ and lugs $b$, substantially as described.

In testimony that I claim the above I have hereunto subscribed my name in the presence of two witnesses.

GEORGE ELSEY.

Witnesses:
LORENZO HAPGOOD,
E. W. EDSON.